US012056976B2

(12) United States Patent
Demange et al.

(10) Patent No.: US 12,056,976 B2
(45) Date of Patent: Aug. 6, 2024

(54) SECURE CONTAINER FOR STORING OR TRANSPORTING VALUE DOCUMENTS, AND SYSTEM FOR SECURING STORAGE AND TRANSPORTATION OF VALUE DOCUMENTS

(71) Applicant: SICPA HOLDING SA, Prilly (CH)

(72) Inventors: Raynald Demange, Montagny-près-Yverdon (CH); Alain Mayer, Saint-George (CH); Kalin Nicolov, Nyon (CH); Bart Suichies, St Legier la Chiesaz (CH); Christine Reinhard, Bussigny (CH)

(73) Assignee: SICPA HOLDING SA, Prilly (CH)

( * ) Notice: Subject to any disclaimer, the term of this patent is extended or adjusted under 35 U.S.C. 154(b) by 26 days.

(21) Appl. No.: 18/013,684

(22) PCT Filed: Jun. 25, 2021

(86) PCT No.: PCT/EP2021/067528
§ 371 (c)(1),
(2) Date: Dec. 29, 2022

(87) PCT Pub. No.: WO2022/002793
PCT Pub. Date: Jan. 6, 2022

(65) Prior Publication Data

US 2023/0360460 A1 Nov. 9, 2023

(30) Foreign Application Priority Data

Jun. 30, 2020 (EP) .................................... 20183032

(51) Int. Cl.
*G07D 11/125* (2019.01)
*G07D 11/225* (2019.01)
*G07D 11/30* (2019.01)

(52) U.S. Cl.
CPC ......... *G07D 11/125* (2019.01); *G07D 11/225* (2019.01); *G07D 11/30* (2019.01)

(58) Field of Classification Search
CPC ..... G07D 11/125; G07D 11/225; G07D 11/30
See application file for complete search history.

(56) References Cited

U.S. PATENT DOCUMENTS 6,883,707 B2 4/2005 Nagasaka et al.
10,676,980 B2 * 6/2020 Grant ........................ E05G 1/14
(Continued)

FOREIGN PATENT DOCUMENTS

DE 60113234 7/2006
EP 2511881 10/2012
EP 2511882 10/2012

OTHER PUBLICATIONS

International Search Report and Written Opinion issued with respect to application No. PCT/EP2021/067528.

*Primary Examiner* — William L Miller
(74) *Attorney, Agent, or Firm* — Muncy, Geissler, Olds & Lowe, P.C.

(57) ABSTRACT

The invention relates to a secure container for storing value documents, e.g. banknotes, having respective value document identification numbers marked thereon, and a corresponding securing system that, upon detection of an intrusion, neutralizes the value documents and delivers in real time over a communication network an alert message containing at least the value document identification numbers to authorities and/or ATMs or carrier, and prevents any transaction based on said neutralized value documents via said ATMs.

13 Claims, 4 Drawing Sheets

(56) References Cited

U.S. PATENT DOCUMENTS

| | | | | |
|---|---|---|---|---|
| 2003/0011466 | A1 | 1/2003 | Samuel et al. | |
| 2010/0027851 | A1* | 2/2010 | Walther | G07D 7/2041<br>380/243 |
| 2017/0228957 | A1* | 8/2017 | Yokote | G07D 11/225 |
| 2017/0292316 | A1* | 10/2017 | Chang | G07F 19/201 |
| 2017/0356233 | A1* | 12/2017 | Yokote | E05G 5/00 |
| 2019/0130715 | A1* | 5/2019 | Chang | G08B 15/02 |
| 2020/0406664 | A1* | 12/2020 | Munoz Utiel | G07D 7/2016 |
| 2021/0002944 | A1* | 1/2021 | Fumanelli | G07F 19/205 |
| 2021/0335112 | A1* | 10/2021 | Uematsu | G07D 11/00 |
| 2022/0189258 | A1* | 6/2022 | Casimiro | G07F 19/205 |

* cited by examiner

SECURE CONTAINER FOR STORING OR TRANSPORTING VALUE DOCUMENTS, AND SYSTEM FOR SECURING STORAGE AND TRANSPORTATION OF VALUE DOCUMENTS

TECHNICAL FIELD

The present invention relates to the technical field of anti-theft storage and transportation of value documents (e.g. banknotes).

BACKGROUND OF THE INVENTION

In the field of security, it is often necessary to transport large quantities of value documents, in particular banknotes, between different locations. For example, it is common to transport banknotes, e.g. in CIT ("Cash-In-Transit") vans, from a bank vault to an Automated Teller Machine ("ATM") situated in a supermarket or shopping center where they can be dispensed. Because said value documents are theft attractive, protective storage devices have been developed to prevent unauthorized access by keeping them inside a locked, secure and tamper-proof portable container.

With the aim of discouraging attempts to break secure containers and to discourage attacks, secure containers have been developed to, in the case of an attempted theft, a theft, violation, or unauthorized act, invalidate the value documents which are contained therein. It has thus been proposed to associate with these containers neutralization units for releasing and dispersing a neutralization agent on the value documents in the event of an attempt to break in, with the aim of rendering them unusable. Neutralization of value documents, in particular banknotes, is a security means occurring due to the activation of anti-theft devices equipped in CIT vans, automated teller machines (ATMs), security cases, safes or safety boxes. For example, banknotes stored or stacked in an enclosure or banknotes transported in bundles are placed into closed and locked containers which also contain a neutralization unit. Upon any unauthorized attempt, breach to open the container, a specific neutralizing agent such as a staining ink (also referred in the art as indelible ink) will be ejected and delivered onto the stored value documents.

In case of an unauthorized attempt or breach of security, the neutralizing agent comes in contact with the value documents thus allowing the migration of the ink (or glue) on and between the documents stored, stacked or piled in the enclosure thus neutralizing them and rendering them worthless and unusable upon tampering of the secure container. Typically, the neutralization with a staining ink allows to permanently and irreversibly marking value documents by obtaining a typical, well visible or recognizable change, and the neutralization with a glue allows to fuse value documents into a solid brick. An important aspect of the neutralization is to clearly distinguish a value document (e.g. a banknote) stained by a specific "secure" neutralizing agent from a document stained or soiled with some standard agent, for example an ink that anybody may purchase commercially without restriction.

In the case of banknotes, the security containers act as anti-theft devices and are known as "Intelligent Banknote Neutralization Systems" (IBNSs), which are activated when criminals open a protected cash container, such as an ATM or a safe in a cash transportation vehicle. These systems make stolen banknotes unusable, unfitted for circulation and worthless, thus reducing the risk for retailers, banks and other professional cash handlers of becoming victims of crime.

However, it might happen that it is difficult to identify a theft/stolen banknote in case said tampered banknote comprises only light or small stains that are not easily visible and recognized by a human or by a machine. It might also happen that it is difficult to distinguish a theft/stolen banknote from a mere soiled one. As a consequence, said tampered banknotes may be put by accident into circulation or it might be difficult to prove a link between criminals and the theft of banknotes.

Tracing technologies have been developed for police investigations and law enforcement authorities. For example, security systems using forensic markers have been used to link criminals to the crime to improve the chances of successfully identifying said criminals. However, such systems rely on the criminal being apprehended by law enforcement authorities such as the police, and those authorities detecting the invisible marker on the criminal's person.

Police investigations require not only to ensure the note is stained with the neutralizing agent but also to make an indisputable link between the stolen notes, the attack and a potential suspect. Tracing technologies are useful in leading law enforcement authorities to the site where the criminals have tried to open the secure container. In some cases, tracing systems in secure container have led the police to a criminal's home, leading to the arrest of said criminal.

Therefore, a need remains for secure containers to facilitate detection and identification of a tampered security document at the site of collection (ATMs, shops, counters, etc.), and to facilitate identification of criminals involved in an attack on said security containers by allowing the collection of sufficient evidence to convict the criminals. Furthermore, the solution is required to not only help the man on the street to detect and identify a theft/stolen banknote even if said banknote does not comprise sufficiently visible staining spots but also to facilitate law enforcement.

SUMMARY OF THE INVENTION

According to a first aspect, the invention relates to a secure container for storing value documents having respective value document identification numbers marked thereon, said secure container comprising:

- a storing unit configured to store the value documents;
- an intrusion sensor configured to detect an unauthorized intrusion into the secure container and configured to deliver an intrusion signal upon detection of said unauthorized intrusion;
- a neutralization unit configured to receive a neutralization agent having a neutralization agent identification number, and configured to neutralize the stored value documents with said neutralization agent upon reception of the intrusion signal delivered by the intrusion sensor, the secure container further comprising
- an alarm unit connected to the intrusion sensor and configured to receive the intrusion signal, the alarm unit comprising
  - a memory storing the value document identification numbers and the neutralization agent identification number, and
  - a communication unit operable to send data stored in the memory over a communication network upon reception of the intrusion signal,
- wherein, upon reception of the intrusion signal from the intrusion sensor, the alarm unit transmits in real time via the communication unit an alert message to a database through the communication network, the alert message containing the value document identification numbers and the neutralization agent identification number stored in the memory.

The secure container may have its own container identification number that may be stored in the memory of the alarm unit, and the alert message may further contain the container identification number. Preferably, the value documents are banknotes marked with serial numbers and the respective value document identification numbers are the respective banknote serial numbers.

The secure container may further comprise a geo-tracking unit operable to detect geo-location of the secure container and transmit corresponding geo-location data to the alarm unit upon reception of the intrusion signal; and, upon reception of the intrusion signal, the alarm unit acquires in real time geo-location data from the geo-tracking unit and transmits the acquired geo-location data via the communication unit to the database through the communication network. Preferably, the geo-tracking unit is a GPS sensor.

According to the invention, the communication unit of the secure container may further include a processing unit configured to digitally sign data to be transmitted by the communication unit over the communication network.

Preferably, the neutralization unit of the secure container is configured to receive a staining ink (e.g. stored under pressure in a tank). Thus, in case of emission of an intrusion signal by the intrusion sensor, the indelible ink is released by the neutralizing unit into the storing unit and spoils and defaces the value documents.

According to a second aspect, the invention relates to a system for securing storage and transportation of value documents having respective value document identification numbers marked thereon, the system comprising:

a secure container according to the invention as described above wherein the value documents are stored;

a database having a communication interface configured to receive data from the communication unit of the secure container via the communication network; and a control module equipped with a memory module and a processing module and connected to the database and the communication interface, the control module being configured to extract alert data contained in an alert message received from the communication unit of the secure container via the communication interface and store the extracted alert data in the database, the memory module storing a list of electronic communication addresses accessible via the communication network, wherein, upon reception of the alert message by the communication interface, the control module is configured to deliver a warning message to an electronic address from the list via the communication interface through the communication network, the warning message containing at least the value document identification numbers extracted from the alert message.

The warning message may further contain the neutralization agent identification number extracted from the alert message. Preferably, in case the alert message contains the secure container identification number, the warning message further contains this container identification number.

In case the secure container is equipped with a geo-tracking unit as described above, the system may have its control module configured to extract geo-location data received via communication the interface from the communication unit of the secure container and store the extracted geo-location data in the database in association with the stored alert data for the secure container; and the warning message may further contain the geo-location data associated with the stored alert data for the secure container.

In the above system:

the value documents may be banknotes having serial numbers and the respective value document identification numbers are the respective banknote serial numbers;

the list of electronic communication addresses may include an electronic communication address of a communication module of a cash dispenser;

the communication module of the cash dispenser may be configured to receive from the control module through the communication network the security document identification numbers extracted from the alert message; and upon reception of the value document identification numbers via the communication module, the cash dispenser may be configured to refuse any transaction operation with a banknote of which serial number corresponds to one of the value document identification numbers received from the control module via the communication module.

Preferably, in the system according to the invention:

the value documents are banknotes having serial numbers and the respective value document identification numbers are the respective banknote serial numbers;

the list of electronic communication addresses includes electronic communication addresses of respective communication modules of a plurality of cash dispensers;

each communication module of the cash dispensers is configured to receive from the control module through the communication network the value document identification numbers extracted from the alert message;

upon reception of the value document identification numbers via its communication module, each cash dispenser is configured to refuse any transaction operation with a banknote of which serial number corresponds to one of the value document identification numbers received from the control module via the communication module;

the memory module of the control module stores geo-location data corresponding to the respective cash dispensers;

the control module is further configured to determine, from the stored geo-location data of the cash dispensers and geo-location data of the secure container stored in the database, respective location of cash dispensers closest to the secure container; and the control modules is configured to send via the communication interface through the communication network to the communication modules of the cash dispensers closest to the secure container the value document identification numbers extracted from the alert message received from the secure container.

The present invention will be described more fully hereinafter with reference to the accompanying drawings, in which prominent aspects and features of the invention are illustrated.

DETAILED DESCRIPTION

Figure 1A:
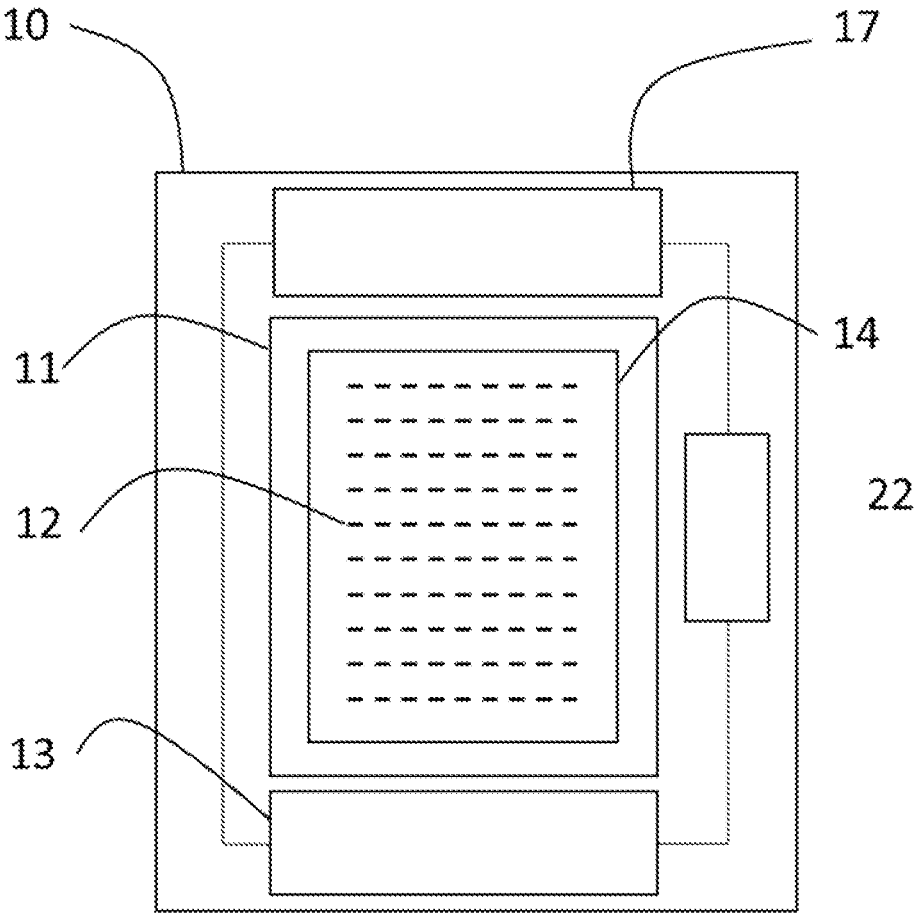
FIG. 1A illustrates a secure container according to the invention.

A secure container 10 according to an example of embodiment of the invention, schematically shown on FIG. 1A, can be used for storing and transporting value documents like banknotes for example. As a storing device, it can be used in a same way as a conventional cassette (e.g. a cash box or an ATM cassette) with a storing unit 11 for stacking the banknotes 12, an intrusion sensor 13 for detecting an intrusion into the container and a neutralization unit 14 configured to receive a neutralization agent 15. The secure container is made of rigid and thick steel plate and has a locking/opening unit 16 to close or open the container. This locking/opening unit 16 can be a mere cylinder lock (with a specific key) or a more sophisticated device comprising, for example, a keyboard for entering a specific code in order to lock/unlock the container or a card reader to read an authorized card in order to allow locking or unlocking the container. The intrusion sensor 13 can detect a breaking of the container or its locking/opening unit, or even an attempt of intrusion (for example via a shock detection sensor). As an intrusion sensor of a conventional cassette, in case of detection of an intrusion, the intrusion sensor 13 sends an intrusion signal to (or mechanically activates) the neutralization unit 14 which then neutralizes the stacked banknotes 12, for example by releasing staining ink (or glue) contained under pressure in a tank and spraying it on the banknotes (e.g. through a nozzle connected to the tank via a pipe with a valve controlled by the neutralization unit). Once the banknotes 12 in the storing unit 11 have been neutralized with the neutralization agent 15, e.g. stained with ink, they cannot be further used for transactions because when marked with a neutralization agent they are easily identifiable as stolen and are refused. However, it may happen that some of the neutralized banknotes are not soiled enough to be easily detected visually (say, at first sight). For example, some banknotes can be soiled with only few very small droplets of staining ink instead of large ink trails and thus can be recycled in retail or even in ATMs (generally not equipped with a staining ink sensor). Only a more thorough inspection can reveal the fraudulent origin of these banknotes. Moreover, it is not easy to discriminate a small droplet of staining ink from an accidental staining with paint or conventional ink (i.e. not a neutralization agent like an IBNS ink) or coffee etc. when the banknote is presented to a cashier or shop employee or anyone from the general public. In order to improve security, the staining ink is generally an IBNS staining ink, i.e. an ink having very well identifying chemical/physical characteristics (e.g. specific chemical composition, possibly with taggants having unique properties like luminescence under proper illumination or IR absorbing properties etc.). These IBNS inks are also known as security inks. Thus, a security ink cannot be confused with an ordinary ink (freely commercially available) or any accidental soil. A presence of such an IBNS security ink on a banknote (even in infinitesimal quantity) unambiguously establish a fraudulent origin of this banknote. A difficulty with taggants (e.g. inorganic like rare earth elements, or nanoparticles) is that they generally provide a limited coding capacity. Organic taggants like DNA offer more possibilities, but requires further costly tests. Each neutralization agent has an assigned neutralization agent identification number allowing to uniquely identify it, which uniquely corresponds to its above mentioned specific chemical/physical characteristics.

Figure 1B:
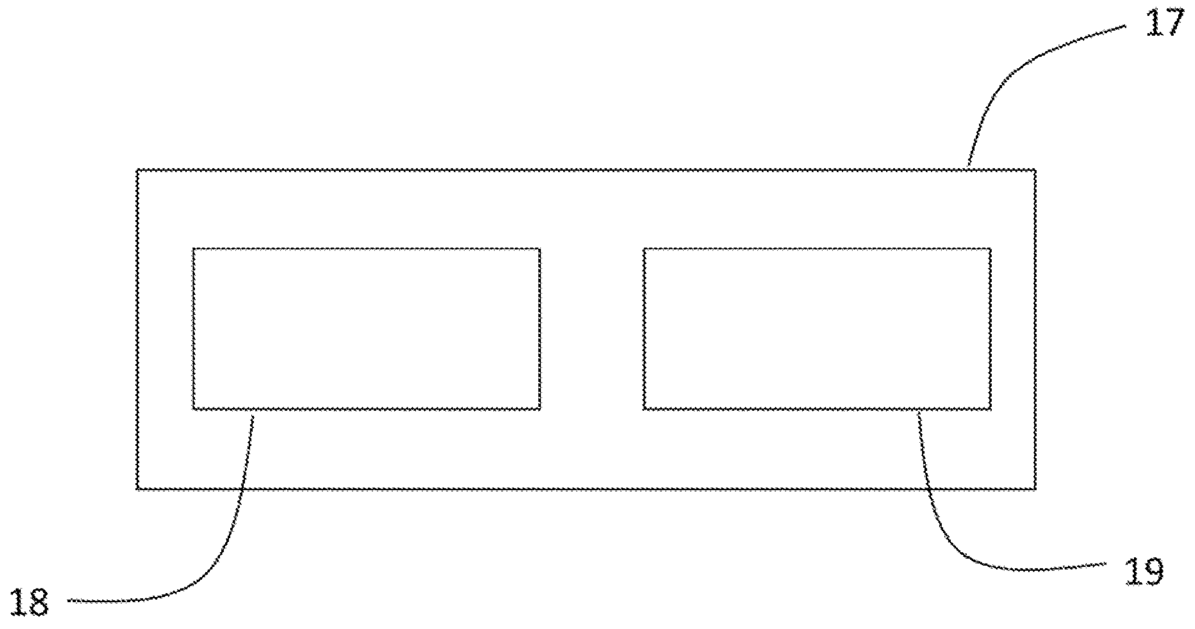
FIG. 1B illustrates a view of the alarm unit of the secure container of FIG. 1A.

In order to overcome these security breaches, the secure container 10 further comprises an alarm unit 17 shown on FIG. 1B (powered by a battery) connected to the intrusion sensor 13 and configured to receive the intrusion signal delivered by the intrusion sensor. This connection can be a wire connection (to receive an electrical impulse corresponding to the intrusion signal) or can be even a mechanical one (the intrusion signal corresponds to a mechanical action of the intrusion sensor on a switch to activate the alarm unit). Preferably, the intrusion signal is transmitted via a wireless connection between the intrusion sensor 13 and the alarm unit 17: e.g. by radio waves like Bluetooth for nearby connection, or Wi-Fi via a Wi-Fi communication network for more distant signal transmission. The alarm unit 17 is preferably located within the secure container 10. However, in some variants, the alarm unit can be remote with respect to the secure container itself: for example, it can be inside an ATM containing the secure container (but separate from the container), or within a CIT van transporting the secure container.

Figure 2A:
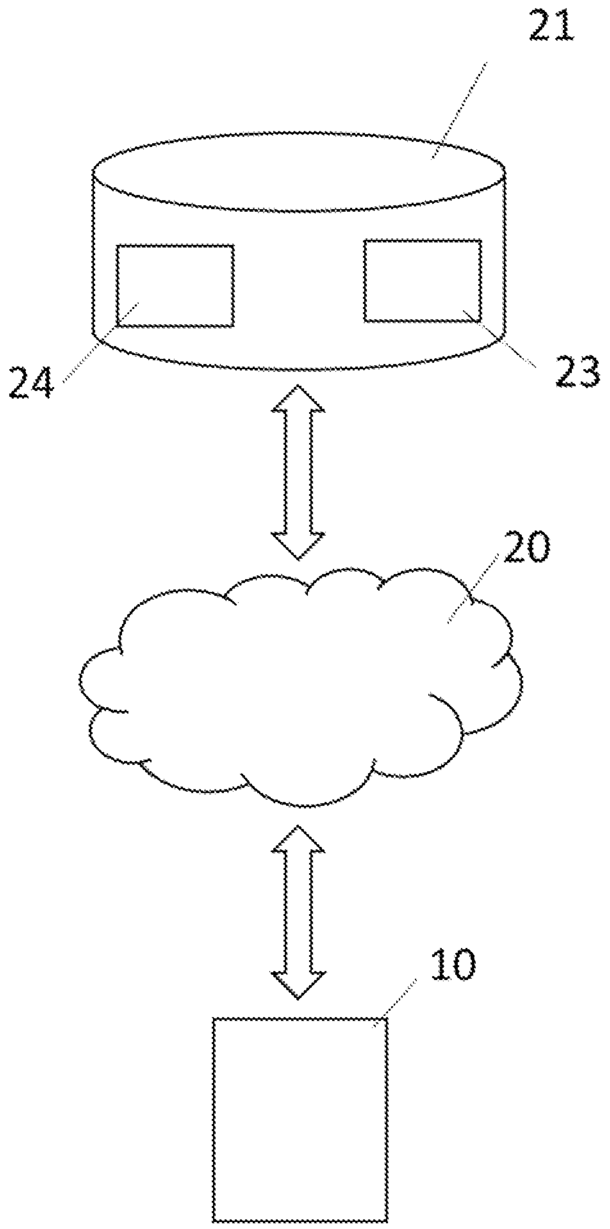
FIG. 2A illustrates a system for securing storage and transportation of value documents according to the invention.

The alarm unit 17 comprises a memory 18 and a communication unit 19 operable to send data stored in the memory 18 over a communication network 20 to an external database 21 (see FIG. 2A), upon reception of the intrusion signal from the intrusion sensor 13. The communication network 20 can be of Wi-Fi type for example, or any mobile/smartphone communication network, and transmission of data is carried out via an antenna capable to transmit a radio signal to the exterior of the secure container. In order to improve security, each secure container has an identification number is assigned to it which uniquely identifies the container. The memory 18 of the alarm unit 17 stores the container identification number, the value document identification numbers of the value documents stored in the storing unit 11 and the neutralization agent identification number of the neutralization agent 15 of the neutralization unit 14. An advantage of associating the identification number of the value document or the container and the identification number of the neutralization agent is that it overcomes the above mentioned limited coding capacity of some staining inks (i.e. their capacity to discriminate between different intrusion events based on quantifiable differences in their composition). The container identification number may be stored permanently in the memory 18. The value document identification numbers and the neutralization agent identification number are entered in the memory 18 when charging the secure container 10 with, respectively, the corresponding banknotes and neutralization agent. The operation of entering the identification numbers can be performed manually (e.g. via a numeric keypad connected to the alarm unit), or automatically via a card reader capable to read a card (inserted by an operator), or via a memory stick, containing these numbers and connected to the alarm unit. Preferably, the serial numbers of the banknotes to be loaded in the memory 18 are read by a dedicated device performing an Optical Character Recognition (OCR) (e.g. as disclosed in the U.S. Pat. No. 6,883,707B2, or via the USF-50 Banknote sorter manufactured by Glory Ltd.). The agent, or the company, in charge of the operation of storing the serial numbers in the memory may further sign the transferred data (e.g. with a private key) in order to trace the operation. Thus, once the secure container has been charged with the banknotes and closed, the memory 18 contains all the data uniquely identifying the secure container, the banknote serial numbers of the stored banknotes and the neutralization agent number.

Upon reception of the intrusion signal from the intrusion sensor 13, the alarm unit 17 transmits in real time via the communication unit 19 an alert message to the database 21 through the communication network 20, this alert message containing at least the value document identification numbers and the neutralization agent identification number stored in the memory. Preferably, the alert message also contains the secure container identification number. Information stored in the database 21 can be shared in real time (in whole or in part) by selected stakeholders like, for example, the police, security services of banks, IBNS manufacturers, CIT companies etc. In case of an attack of the secure container, the real time alert allows the authorities having access to the database 21 to quickly implement the appropriate countermeasures in their respective areas of responsibility.

The serial numbers of stolen (or at least stained) banknotes can thus be blacklisted as fast as possible, preventing the criminals to use the notes by putting them back into the cash-cycle (this is mainly done by trying to feed the notes into an ATM). Indeed, a mere reading of a serial number is sufficient to detect a stained banknote by checking an up-to-date blacklist stored in the secure database 21. For example, a cashier in a bank branch can take a decision regarding a suspect banknote (i.e. stained by an IBNS or soiled with standard ink) only by reading the serial number and checking the blacklist stored in the secure database 21. There is no need to conduct the testing with complex and costly devices (e.g. DNA detection) at the bank branch. The same applies to the automatic checking of banknotes carried out in an ATM with a deposit functionality and access to the (up-to-date) blacklist of the serial numbers in the database 21. Banknote handling machines capable to sort out blacklisted notes can now automatically inform the law authorities immediately by indicating the position where these banknotes appear on the market. Cashiers at Central Banks can now easily distinguish a note stained with IBNS ink (which in some countries may not be refunded) from a note accidentally stained with for instance paint, traditional ink, coffee when such a note is presented to them. More globally a cashier in a commercial bank, a shop employee or anyone from the general public in possession of a suspect note with stains could benefit from an application on his smartphone giving access (through the communication network) to the blacklisted serial numbers in the database 21 that can confirm that this note has been stolen just by scanning the serial number of the note and checking whether it is back-listed.

Generally, existing databases like EUSISS ("EUropean Smock and Ink Staining System"), containing information on staining ink references and corresponding taggants (neutralization agent), allow authorities to perform forensic analysis of suspect soiled banknotes. However, they provide no link between banknote serial numbers of an attacked secure container and taggant identification number or neutralization agent identification number used for soiling the banknotes stored in this container. In order to link a taggant-ID to a crime, authorities must perform a comparison of the taggant ID and possible crimes scenes, resulting often in more than one result. Further they have to collect manually all the data from the taggant and ink suppliers. The invention eliminates such operations by linking in real time a crime (i.e. an attack of the secure container) to the serial numbers of the stained banknotes and the identification number of the specific neutralization agent used for staining these banknotes, and possibly the identification number of the secure container, and allows detection, identification and traceability of the stolen banknotes back to the crime scene. This demotivates thieves since the stolen banknotes can easily be removed from circulation and legal actions and enforcement are facilitated. Thus, in case of detection of a stained banknote by merely checking its serial number with respect to blacklisted ones, and performing a subsequent material-based identification of the staining agent corresponding to the blacklisted serial number, legal authorities can establish a link between the identified staining agent and a specific crime. This forensic identification can be used in a court to establish a link between the identified spoiling agent and a specific crime.

According to a preferred variant, the secure container 10 further comprises a geo-tracking unit 22 (e.g. a GPS receiver of the "Global Positioning System") connected to the alarm unit 17 and capable to receive an intrusion signal from the intrusion sensor 13 and, upon reception of the intrusion signal, detect (in real time) a geo-location of the secure container. The geo-tracking unit 22 is configured to transmit the detected geo-location to the alarm unit 17, and the communication unit 19 of the alarm unit then sends the detected geo-location to the database 21 via the communication network 20 (alternatively, the geo-location data may be part of the alert message). Thus, in case of an attack of the secure container 10, the database receives in real time both the alert message and the geo-location of the attack event: a link can be quickly established between the location of the attack and at least the serial numbers of the neutralized banknotes in the attacked secure container and the specific neutralization agent used to soil these banknotes. The police, having access to the database 21, can quickly act more efficiently due to the real-time location of the attack. As the blacklisted serial numbers are provided in real time to the concerned authorities, and the corresponding (soiled) banknotes can then hardly circulate, a person found in possession of a blacklisted banknote can be considered as a suspect of the attack. Moreover, a cash handling machine reading a serial number of a banknote fed into it by a depositor, and detecting that it is blacklisted (by having access to the blacklist in the database 21), will refuse to credit the depositor account while retaining the banknote for investigation together with the identity of the depositor.

In order to improve security of the transmission of data between the communication unit 19 and the database 21, the communication unit may further include a processing unit configured to digitally sign data that is to be transmitted by the communication unit 19 over the communication network 20 via a private key (e.g. a 256-bit number) of a symmetric or asymmetric cryptographic system. Of course, a corresponding decryption key must be used to read the encrypted data received by the database. In case of an asymmetric encryption system, a public key is used to authenticate the data received by the database (i.e. prove that this data has been encrypted via a corresponding authorized private key, and thus provide a digital proof of data integrity). Moreover, the data received by the database 21 may be blockchained in order to prevent falsification of data. Also, the public keys of the different stakeholders may be stored in a blockchain.

The database 21 has a communication interface 23 configured to receive data from the communication unit 19 of the secure container 10 via the communication network 20. The database 21 has also a control module 24 equipped with a memory module 25 and a processing module 26. The control module 24 is configured to extract alert data contained in an alert message (i.e. at least the banknote serial numbers and neutralization agent ID number, and possibly also the secure container ID number) received from the communication unit 19 of the secure container 10, and store the extracted alert data in the database 21. The memory module 25 contains a list of electronic communication addresses of selected stakeholders that are accessible via the communication network 20. The control module 24, upon reception of the alert message by the communication interface 23, is further configured to deliver a warning message to a stored electronic address via the communication interface 23 through the communication network 20, the warning message containing (at least) the banknote serial numbers extracted from the alert message. The warning message may further contain the neutralization agent identification number extracted from the received alert message, and possibly also the secure container identification number (if it was contained in the received alert message).

Figure 2B:
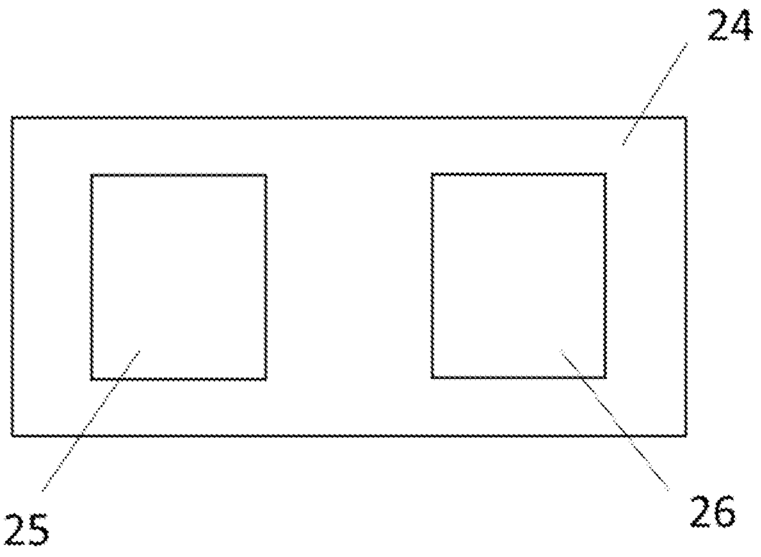
FIG. 2B illustrates a control module of the database of the system of FIG. 2A.

The control module 24 (see FIG. 2B) may further be configured to extract geo-location data received, in addition to an alert message, by the communication interface 23 from a communication unit of a secure container equipped with a geo-tracking unit. The control module 24 stores the extracted geo-location data in the database 21 in association with the stored alert data extracted from the received alert message. The control module 24 also sends the extracted geo-location data with the corresponding warning message to the stored electronic address.

In case the data received by the communication interface 23 is signed (as explained above), the control module 24 of the database 21 is configured to read the received signed data. If the received data is encrypted with an (authorized) encryption key, the processing module 26 is configured to decrypt the data with a corresponding decryption key stored in the memory module 25. If an asymmetric encryption is used, the memory module stores the corresponding public key and the control module 24 is configured to check, via its processing module 26, with the stored public key that the received signed data has been signed with an authorized private key (thus making sure that the received data indeed comes from a secure container).

According to an embodiment of the invention, the above system for securing storage and transportation of value documents according to the invention, comprising the secure container 10 and the database 21, may be more specifically adapted to the security of an automatic cash dispenser (e.g. an ATM, or an ATM having cash deposit facility, or more generally a cash handling machine). The cash dispenser has a communication module that is configured to receive from the control module 24, in real time through the communication network 20, the banknote serial numbers extracted from the alert message received by the database 21 from the communication unit 19 of the alarm unit 17 of the secure container 10. The cash dispenser then updates a file (stored in a memory of the cash dispenser) containing a list of blacklisted serial numbers. In this case, the list of electronic communication addresses stored in the memory module 25 of the control module 24 includes an electronic communication address of the communication module of the cash dispenser. Upon reception of the banknote serial numbers via its communication module, the cash dispenser is configured to refuse any transaction operation with a banknote of which serial number corresponds to one of the value document identification numbers received from the control module via the communication module. Thus, the invention allows to prevent any attempt to recycle the cash stolen by criminals in the attack of the secure container, immediately after said attack.

In case the container 10 is equipped with a geo-tracking unit 22, and the above system has a control module 24 operable to extract geo-location data of the secure container received (together with an alert message) communication interface 23, and the list of electronic communication addresses stored in the memory module 25 includes electronic communication addresses of respective communication modules of a plurality of cash dispensers, and the memory module 25 stores geo-localization data of the respective cash dispensers of the list, then the processing module can find the respective geo-locations of cash dispensers that are closest to the received geo-location of the secure container. Indeed, each communication module of the plurality of cash dispensers is configured to receive from the control module through the communication network the banknote serial numbers extracted from the alert message together with the associated geo-localization data stored in the database 21 that were received with the corresponding warning message delivered by the control module 24. Upon reception of the banknote serial numbers via its communication module, each cash dispenser is also configured to refuse any transaction operation with a banknote of which serial number corresponds to one of the banknote serial numbers received from the control module 24. The processing module 26 of the control module 24 can calculate the respective locations of cash dispensers that are closest (according to a given distance threshold) to the secure container geo-location data, by comparing the geo-localization data of the cash dispensers and geo-location data of the secure container (stored in the database 21). Once this calculation is performed, the control module 24 can send, via the communication interface 23 through the communication network 20, to the communication modules of the cash dispensers closest to the secure container a warning message containing the banknote serial numbers extracted from the alert message received from the secure container and thus prevent, in real time from reception of the alert message, any cash recycling operation even when performed quickly after an attack via any close cash dispenser.

The system for securing storage and transportation of value documents according to the invention, comprising the secure container 10 and the database 21, allows detection and identification, traceability of theft/stolen banknotes back to the crime scene. This system provides a means to:

i) allow the easy and fast removal of theft/stolen banknotes from circulation;
ii) allow the tracking of theft/stolen banknotes, and
iii) allow to link the theft/stolen banknotes with the crime (and thus allows a legal investigation).

In case of the detection of a stained banknote by reading the serial number, a subsequent material-based identification of the staining agent can be carried out to establish a link between the identified agent and a specific crime. This forensic identification can be used in a court to establish a link between the identified spoiling agent and a specific crime.

The above disclosed subject matter is to be considered illustrative, and not restrictive, and serves to provide a better understanding of the invention defined by the independent claims.

The invention claimed is:

1. A secure container for storing value documents having respective value document identification numbers marked thereon, said secure container comprising:

a storing unit configured to store the value documents;

an intrusion sensor configured to detect an unauthorized intrusion into the secure container and configured to deliver an intrusion signal upon detection of said unauthorized intrusion;

a neutralization unit configured to receive a neutralization agent having a neutralization agent identification number, and configured to neutralize the stored value documents with said neutralization agent upon reception of the intrusion signal delivered by the intrusion sensor, wherein the secure container further comprises;

an alarm unit connected to the intrusion sensor and configured to receive the intrusion signal, the alarm unit comprising:

a memory storing the value document identification numbers and the neutralization agent identification number, and a communication unit operable to send data stored in the memory over a communication network upon reception of the intrusion signal, wherein the alarm unit is configured to transmit in real time via the communication unit an alert message to a database through the communication network upon receiving of the intrusion signal from the intrusion sensor, the alert message containing the value document identification numbers and the neutralization agent identification number stored in the memory.

2. The secure container according to claim 1, wherein the secure container has a container identification number and the memory stores the container identification number, and the alert message further contains the container identification number.

3. The secure container according to claim 1, wherein the value documents are banknotes having serial numbers and the respective value document identification numbers are the respective banknote serial numbers.

4. The secure container according to claim 1, further comprising a geo-tracking unit operable to detect geo-location of the secure container and transmit corresponding geo-location data to the alarm unit upon reception of the intrusion signal;

wherein the alarm unit is configured to acquire in real time geo-location data from the geo-tracking unit and transmit the acquired geo-location data via the communication unit to the database through the communication network upon receiving of the intrusion signal.

5. The secure container according to claim 4, wherein the geo-tracking unit is a GPS sensor.

6. The secure container according to claim 1, wherein the communication unit includes a processing unit configured to digitally sign data to be transmitted by the communication unit over the communication network.

7. The secure container according to claim 1, wherein the neutralization unit is configured to receive a staining ink.

8. A system for securing storage and transportation of the value documents having respective value document identification numbers marked thereon, the system comprising:

the secure container according to claim 1;

the database having a communication interface configured to receive data from the communication unit of the secure container via the communication network; and a control module equipped with a memory module and a processing module and connected to the database and the communication interface, the control module being configured to extract alert data contained in an alert message received from the communication unit of the secure container via the communication interface and store the extracted alert data in the database, the memory module storing a list of electronic communication addresses accessible via the communication network, wherein the control module is configured to deliver a warning message to an electronic address from the list via the communication interface through the communication network upon receiving of the alert message by the communication interface, the warning message containing at least the value document identification numbers extracted from the alert message.

9. The system according to claim 8, wherein the warning message further contains the neutralization agent identification number extracted from the alert message.

10. The system according to claim 8, wherein the secure container has a container identification number and the memory stores the container identification number, and the alert message further contains the container identification number, and the warning message further contains the container identification number extracted from the alert message.

11. The system according to claim 8, wherein the secure data container further comprises:

a geo-tracking unit operable to detect geo-location of the secure container and transmit corresponding geo-location data to the alarm unit upon reception of the intrusion signal;

wherein the alarm unit is configured to acquire in real time geo-location data from the geo-tracking unit and transmit the acquired geo-location data via the communication unit to the database through the communication network upon receiving of the intrusion signal, the control module is configured to extract geo-location data received via the communication interface from the communication unit of the secure container and store the extracted geo-location data in the database in association with the stored alert data for the secure container; and the warning message further contains the geo-location data associated with the stored alert data for the secure container.

12. The system according to claim 8, wherein the value documents are banknotes having serial numbers and the respective value document identification numbers are the respective banknote serial numbers;

the list of electronic communication addresses includes an electronic communication address of a communication module of a cash dispenser;

the communication module of the cash dispenser is configured to receive from the control module through the communication network the value document identification numbers extracted from the alert message; and upon reception of the value document identification numbers via the communication module, the cash dispenser is configured to refuse any transaction operation with a banknote of which serial number corresponds to one of the value document identification numbers received from the control module via the communication module.

13. The system according to claim 11, wherein the value documents are banknotes having serial numbers and the respective value document identification numbers are the respective banknote serial numbers;

the list of electronic communication addresses includes electronic communication addresses of respective communication modules of a plurality of cash dispensers;

each communication module of the cash dispensers is configured to receive from the control module through the communication network the value document identification numbers extracted from the alert message;

upon reception of the value document identification numbers via its communication module, each cash dispenser is configured to refuse any transaction operation with a banknote of which serial number corresponds to one of the value document identification numbers received from the control module via the communication module;

the memory module of the control module stores geo-location data corresponding to the respective cash dispensers;

the control module is further configured to determine, from the stored geo-location data of the cash dispensers and geo-location data of the secure container stored in the database, respective location of cash dispensers closest to the secure container; and the control module is configured to send via the communication interface through the communication network to the communication modules of the cash dispensers closest to the secure container the value document identification numbers extracted from the alert message received from the secure container.

* * * * *